US011805718B2

(12) United States Patent
Putz

(10) Patent No.: US 11,805,718 B2
(45) Date of Patent: Nov. 7, 2023

(54) DOCKING APPARATUS HAVING A DOCKING RECEPTACLE AND A DOCKING INSERT, AND METHOD FOR COUPLING A VEHICLE

(71) Applicant: SYN TRAC GmbH, Bad Goisern (AT)

(72) Inventor: Stefan Putz, Bad Goisern (AT)

(73) Assignee: SYN TRAC GMBH, Bad Goisern (AT)

( * ) Notice: Subject to any disclaimer, the term of this patent is extended or adjusted under 35 U.S.C. 154(b) by 509 days.

(21) Appl. No.: 16/870,593

(22) Filed: May 8, 2020

(65) Prior Publication Data

US 2020/0267884 A1    Aug. 27, 2020

Related U.S. Application Data

(63) Continuation of application No. PCT/EP2018/080817, filed on Nov. 9, 2018.

(30) Foreign Application Priority Data

Nov. 10, 2017  (DE) .......................... 102017126476.0

(51) Int. Cl.
*A01B 59/06* (2006.01)
*B60D 1/62* (2006.01)

(52) U.S. Cl.
CPC .......... *A01B 59/063* (2013.01); *A01B 59/062* (2013.01); *B60D 1/62* (2013.01)

(58) Field of Classification Search
None
See application file for complete search history.

(56) References Cited

U.S. PATENT DOCUMENTS

2009/0322072 A1   12/2009   Tiberghien et al.
2011/0291383 A1   12/2011   Goulet et al.
(Continued)

FOREIGN PATENT DOCUMENTS

AT       514147 A1    10/2014
CH       701819 A1     3/2011
(Continued)

OTHER PUBLICATIONS

International Search Report and Written Opinion for International Applicaton No. PCT/EP2018/080817 dated Jan. 30, 2019.

*Primary Examiner* — James M Anderson, II
(74) *Attorney, Agent, or Firm* — Foley Hoag LLP; Stephen J. Kenny; Vincenzo DiMonaco

(57) ABSTRACT

The disclosure relates to a coupling device. This is known below as a docking receptacle. The docking receptacle comprises an approximately U-shaped pilot centring device with an insertion trough tapering approximately conically in an insertion direction for pre-centring a docking insert designed to mate with the docking receptacle, at least a first and a second centring device, with the first and the second centring devices each comprising two coupling elements which are designed for centring a docking insert with respect to the docking receptacle along four centring axes in an insertion direction, and wherein a drawing-in device with two hydraulically actuated drawing-in or capture hooks are provided. The disclosure further relates to a docking insert. This comprises a pilot centring body having an insertion tray tapering approximately conically in an insertion direction and extending in the horizontal direction, at least a first and a second centring device, wherein the first and the second centring devices each comprise at least two coupling elements and/or coupling counter-elements which are designed for centring the docking insert with respect to a docking receptacle along four centring axes extending in an insertion (Continued)

direction and two capture pins extending transversely to the insertion direction in the horizontal. According to the disclosure, a coupling assembly or a docking assembly is, furthermore, provided comprising the docking receptacle and the correspondingly mating docking insert.

28 Claims, 6 Drawing Sheets

(56) References Cited

U.S. PATENT DOCUMENTS

| | | | |
|---|---|---|---|
| 2016/0052563 A1* | 2/2016 | Scharmüller | B62D 27/06 |
| | | | 280/762 |
| 2016/0115999 A1 | 4/2016 | Huegerich | |
| 2020/0267884 A1 | 8/2020 | Putz | |

FOREIGN PATENT DOCUMENTS

| | | | |
|---|---|---|---|
| DE | 2900866 A1 | 7/1980 | |
| DE | 3009284 A1 | 9/1981 | |
| DE | 8215040 U1 | 7/1982 | |
| DE | 4132889 A1 | 4/1992 | |
| DE | 4132889 C2 * | 12/1992 | A01B 59/00 |
| DE | 202005005676 U1 | 8/2005 | |
| DE | 202011106833 U1 | 2/2012 | |
| FR | 2687115 A1 | 8/1993 | |
| JP | 2008-153087 A | 7/2008 | |
| JP | 2008/289606 A | 12/2008 | |
| JP | 2011-223898 A | 11/2011 | |
| WO | WO-2014/153577 A1 | 10/2014 | |
| WO | WO-2019/092204 A1 | 5/2019 | |

\* cited by examiner

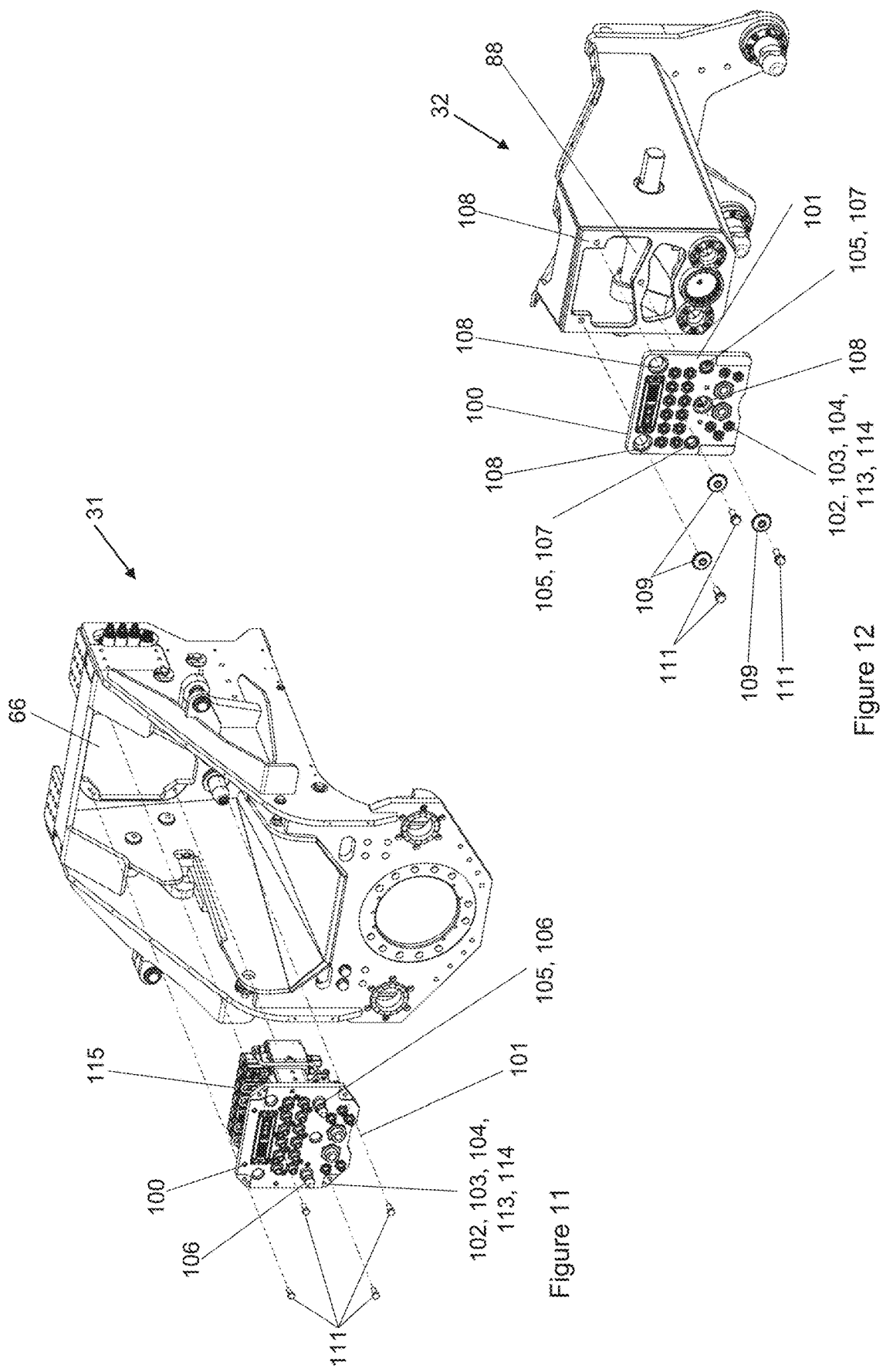

DOCKING APPARATUS HAVING A DOCKING RECEPTACLE AND A DOCKING INSERT, AND METHOD FOR COUPLING A VEHICLE

CROSS-REFERENCE TO RELATED APPLICATIONS

This application is a Continuation of and claims the benefit of priority under 35 USC 120 to PCT/EP2018/080817 filed Nov. 9, 2018, which claims priority to DE 10 2017 126 476.0 filed Nov. 10, 2017, the entire contents of each are hereby incorporated by reference.

The present disclosure relates to a docking receptacle, a docking insert and a docking device having a docking receptacle and a docking insert.

A coupling device or trailer coupling is a device by means of which a vehicle can be connected to a trailer. Depending on the type of towing vehicle and the trailer there are designs such as, for instance, a pin coupling, common in agriculture and forestry, a ball hitch coupling, common on passenger cars, an open-jaw coupling on heavy-goods vehicles and tractors and a fifth-wheel coupling on articulated vehicles.

Coupling devices such as the trailer coupling (front and rear using 40 mm pins), a tractor drawbar, a hitch hook, a piton fix, a ball hitch coupling (K 80 play-free coupling ball similar to the passenger car trailer hitch in a reinforced version), a three-point hydraulic coupling (rear lifting mechanism) on rear and front (optional front lifting mechanism), with self-locking quick-release couplings, also known as capture hooks (optional), a drawbar, an A-frame coupling (Weiste triangle), front loader (optional), a municipal mounting plate, a fifth-wheel coupling for large tractors or even a mid-mount for mowing attachments are known for attaching implements to a commercial vehicle.

A three-point hitch, also known as a three-point linkage, is a hydraulic device on tractors for coupling and lifting implements. This is often found on the rear of a tractor (rear lifting mechanism). When it is mounted on the front of the tractor it is known as a front lifting mechanism. Downwards movement is either under hydraulic power or, on simpler systems, under the weight of the elements (lower control arms) themselves or of the implement.

AT 514 147 B1 discloses a coupling part of a vehicle coupling system, wherein the coupling part has a positioning device for guiding a coupling counter-part into a fixing position during a coupling operation. A fixing device is arranged moveably between a release position and a fixing setting, wherein, in the fixing setting, the fixing device can fix a coupling counter-part in the fixing position in a positionally secure manner. The coupling part has a contacting device with moveably arranged terminals wherein, in the fixing setting of the fixing device, the terminals can be moved by the contacting device to a coupling counter-part in the fixing position, and wherein the positioning device has a capture device for bringing a coupling counter-part disposed in a capture range into the fixing position. The capture device has at least one moveable capture arm and the positioning device has a centring receptacle into which an insert part of the coupling counter-part can be introduced, and wherein the centring receptacle tapers towards a first end of the centring receptacle.

Further coupling assemblies are disclosed in DE 4132889 A1, DE 2900866 A1, DE 3009284 A1, DE 20 2005 005 676 A1, DE 8215040 A1, CH 701819 A1 and FR 2687115 A1. In practical operation of utility vehicles, it is often necessary to change the implement a number of times. Implements can only be coupled and uncoupled by an experienced person with a significant amount of time required and great effort, since changing the trailer requires working on the hitching or coupling system, to connect the PTO shaft or electrical connections, for instance. A changeover of this kind represents a not insignificant potential hazard, as someone needs to work in the danger zone between the towing vehicle and trailer to complete the change. This is why two people are generally required.

SUMMARY OF THE DISCLOSED SUBJECT MATTER

The problem addressed by the disclosure is thus to provide a coupling assembly with coupling devices designed to mate and at least one such coupling device, which forms a secure and reliable connection between a vehicle and an implement, and wherein the connection between vehicle and implement can be established by one person. The device according to the disclosure permits a safe and reliable connection between a vehicle and an implement or an additional axle or a trailer.

According to the disclosure, a docking assembly is designed with a first docking device and a second docking device, wherein the first docking device has an approximately U-shaped pilot centring device with a conically tapering insertion trough or at least one first and one second centring device, wherein the first and the second centring device each comprise coupling elements or coupling counter-elements, and having a second docking device with a pilot centring body having an insertion tray extending in the horizontal direction and tapering approximately conically in an insertion direction having at least one first and one second centring device, wherein the first and the second centring devices each comprise two coupling elements and/or coupling counter-elements for centring the second docking device in the first docking device.

According to the disclosure, a first docking wall can be formed, particularly in an insertion direction, at the rear on the insertion trough in a plane extending transverse to the insertion direction, in which wall a docking recess is formed for receiving a coupling plate fixed in the insertion direction and a second docking wall extending in a plane transverse to the insertion direction can be formed on the second docking device on the front of the insertion body in the insertion direction, wherein a docking recess is formed for receiving an axial securely fixed coupling plate in the second docking wall.

According to the disclosure, a drive shaft coupling device can additionally be provided in the first docking walls of each of the first and second docking devices for connecting a drive shaft on the implement to a drive shaft on the vehicle, wherein the drive shaft coupling devices are designed to be aligned axially in the retracted state and the locked state of the docking devices to establish a forced connection and are each secured axially so that a forced connection is established on mechanical coupling of the coupling devices.

According to the disclosure, PTO shaft coupling devices can additionally be arranged in each of the second docking walls for connecting a PTO shaft on the implement to a PTO shaft on the vehicle, wherein the PTO shaft coupling devices are aligned with one another in the coupled state and are axially secured on the second docking wall in such a manner that a forced connection is established on connection of the docking devices to one another.

In the context of the present disclosure, a coupling device is construed as a part of a coupling assembly for connecting a vehicle to an implement or additional axles, with coupling devices designed to mate being provided on both the vehicle and implement or additional axle which devices together form the coupling assembly. A coupling assembly is also known below as a docking assembly and a coupling device is also known below as a docking insert or docking receptacle respectively.

A coupling device (docking receptacle, docking insert) is hence a part of a coupling assembly (docking assembly) for connecting a vehicle to an implement, with coupling devices designed to mate (docking receptacle, docking insert) being provided on both the vehicle and the implement, which devices together form the coupling assembly.

According to the disclosure, a first coupling device is provided. This is known below as a docking receptacle. The docking receptacle comprises an approximately U-shaped pilot centring device with an insertion trough tapering approximately conically in an insertion direction for pre-centring a docking insert designed to mate with the docking receptacle, at least a first and a second centring device, with the first and the second centring devices each comprising two coupling elements which are designed for centring a docking insert with respect to the docking receptacle along four centring axes in an insertion direction, and wherein a drawing-in device with two hydraulically actuated drawing-in or capture hooks are provided.

Substantially higher torsional forces can be absorbed along the vehicle longitudinal axis between the vehicle and the implement as a result of the provision of first and second centring devices and the robust design of the docking receptacle.

The use of a docking receptacle according to the disclosure and a mating docking insert makes coupling a trailer or implement to a vehicle considerably easier. A change can be made substantially fully automatically, since the docking receptacle and the docking insert can be lined up to be axially aligned with one another in an insertion direction by means of the centring devices.

The docking receptacle and the docking insert are fixed in position by capture hooks. This means that the operator of the vehicle can remain in the driver's cab during the coupling procedure, which reduces the time required and practically eliminates the potential hazard. Furthermore, the docking insert can be mounted on practically all suitable types of implement and tool, meaning that these can be easily connected to a vehicle provided with a docking receptacle according to the disclosure. For the purpose of the present disclosure, insertion direction is understood to mean a direction or a relative movement in which a "male" design of docking insert is moved for insertion into a "female" design of docking receptacle. The insertion direction is hence always a direction which extends from a coupling end of a docking receptacle towards a vehicle end of a docking receptacle or from an implement end of a docking insert to a coupling end of a docking or in the longitudinal direction of vehicles and implements from a docking insert to a docking receptacle or from a vehicle rear end to a front end of a vehicle.

The first centring device can comprise two coupling counter-elements which are designed as socket-type (approximately tubular) first centring receptacles, which have an insertion portion preferably designed to be conical in the insertion direction and a cylindrical centring portion adjoining this. The second centring device can comprise coupling elements which are designed as centring pins, wherein said centring pins preferably have an insertion portion conical in the insertion direction and a cylindrical centring portion adjacent thereto.

A fixing device can, furthermore, be provided in a fixing region of the first centring recess, wherein the fixing device is designed for axially fixing first centring pins of a docking insert in the first centring recesses of the mating docking receptacle. The fixing device can have, for fixing purposes, hydraulically actuated wedge forks, which can be displaced vertically in such a manner that fixing faces of the wedge forks engage in corresponding locating grooves. The centring grooves can be made convex or bulbous. The coupling elements and/or the coupling counter-elements of the first and the second centring devices can have at least two axial stop devices which limit any relative movement between the docking receptacle and a docking insert.

The stops can preferably be formed on first and/or second centring pins and/or on first and/or second centring recesses, preferably as annular stop faces and extend in a plane perpendicular to the insertion direction. These axial stop faces can have recesses that run radially circumferentially and spaced equally from each other designed to discharge and/or to receive dirt. Soiling of this kind would modify the stop face of the stop in the insertion direction. This is disadvantageous because precise coupling between docking receptacle and docking device is made substantially more difficult.

A second docking wall extending in a plane transverse to the insertion direction can be formed on the insertion trough at the front in the insertion direction. The second centring device is preferably arranged in this second docking wall. A first docking wall extending in a plane transverse to the insertion direction can be formed on the insertion trough at the rear in the insertion direction, which wall is arranged vertically beneath the insertion trough. The first centring device is arranged in the first docking wall. A docking recess for receiving a coupling plate which can be fixed in position can be formed in the second docking wall. The insertion trough can comprise two inner side walls extending vertically and joined to the insertion trough and the second docking wall.

Capture pin sliding guides for receiving corresponding capture pins provided on a docking insert and extending in a linked fashion in the insertion direction can be formed on the inner side walls. These guides are preferably straight-line or linear in form. In addition, external side walls arranged approximately parallel to the inner side walls can be provided. Shafts, on which the capture hooks are mounted for rotation are arranged in corresponding bores in the inner and outer side walls. This has the advantage over a floating mount for the capture hooks, as disclosed in AT 514 147 B1, for instance, that there is practically no play. In this way, a more precise location of the capture hooks in operation becomes possible, distortion is reduced and greater forces can be absorbed.

The capture hooks can thus be arranged in a capture hook space delimited by the inner and outer side walls. The capture hooks and corresponding capture hook cylinders are protected thereby. A drive shaft coupling device for connecting a drive shaft on the vehicle to a drive shaft on the implement can be provided in the first docking wall. A PTO (power take off) shaft coupling device for connecting a PTO shaft on the vehicle to a PTO shaft on the implement can be provided in the second docking wall. These coupling devices are preferably arranged in the area of the first or the second centring device. Furthermore, a vehicle with one and preferably with two docking receptacles according to the disclosure is provided.

According to the disclosure, a second coupling device, which is referred to below as the docking insert, is also provided. This comprises a pilot centring body having an insertion tray tapering approximately conically in an insertion direction and extending in the horizontal direction, at least a first and a second centring device, wherein the first and the second centring devices each comprise at least two coupling elements and/or coupling counter-elements which are designed for centring the docking insert with respect to a docking receptacle along four centring axes extending in an insertion direction and two capture pins extending transversely to the insertion direction in the horizontal.

The first centring device can comprise two coupling elements which are designed as centring pins, wherein the centring pins preferably have a cylindrical centring portion and a conical centring portion in the insertion direction. The second centring device can have two coupling counter-elements which are designed as socket-style second centring recesses. The coupling elements and/or the coupling counter-elements of the first and the second centring devices can have at least two axial stop devices which limit any relative movement between the docking insert and docking receptacle in the axial direction or in the insertion direction.

A second docking wall extending in a plane transverse to the insertion direction can be formed on the insertion body at the front in the insertion direction. A first docking wall extending in a plane transverse to the insertion direction can be formed on the insertion body at the rear in an insertion direction, which wall is arranged vertically beneath the insertion body. A docking recess for receiving a coupling plate which can be fixed in position can be formed in the second docking wall. The insertion body can comprise two side walls extending vertically and joined to the second docking wall and the first docking wall, with capture pins extending transversely to the insertion direction being arranged on the side walls.

A drive shaft coupling device for connecting a drive shaft on the implement to a drive shaft on the vehicle can be provided in the first docking wall. The drive shaft coupling device is preferably disposed in the region of the first centring device. A PTO shaft coupling device for connecting a PTO shaft on the implement to a PTO shaft on the vehicle can be provided in the second docking wall. The PTO shaft coupling device is disposed in the second docking wall preferably in the region of the second centring device. According to the disclosure, an implement is provided with at least one docking insert according to the disclosure. According to the disclosure, furthermore, a coupling assembly or a docking assembly is provided comprising the docking receptacle and the correspondingly mating docking insert. Designing a docking assembly having first and second centring devices along four centring axis moreover has the advantages that a rectangular coupling face is optimally used. The disclosure, furthermore, specifies a method for joining or coupling a docking insert with a docking receptacle.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

FIG. 11: a perspective exploded drawing of a coupling plate and a docking receptacle according to the disclosure, and FIG. 12: a perspective exploded drawing of a further coupling plate and a docking insert according to the disclosure.

Figure 2:
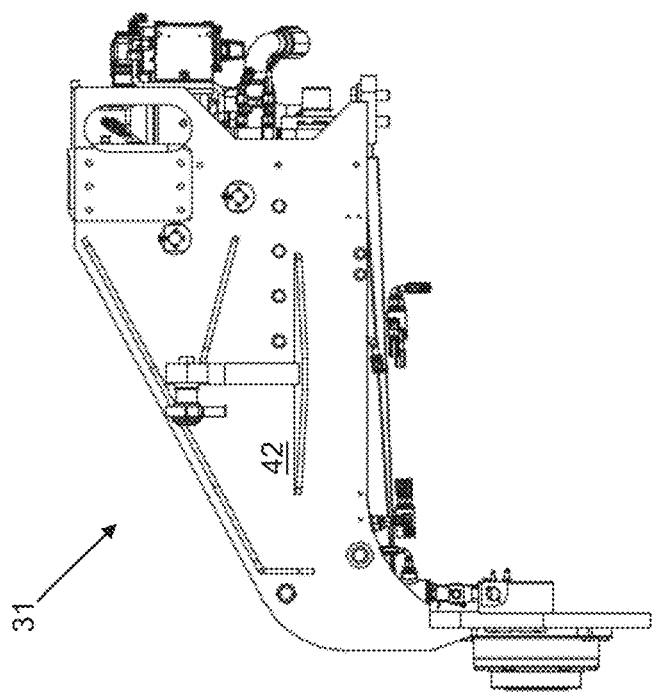
FIG. 2: a side plan view of the docking receptacle.
Figure 1:
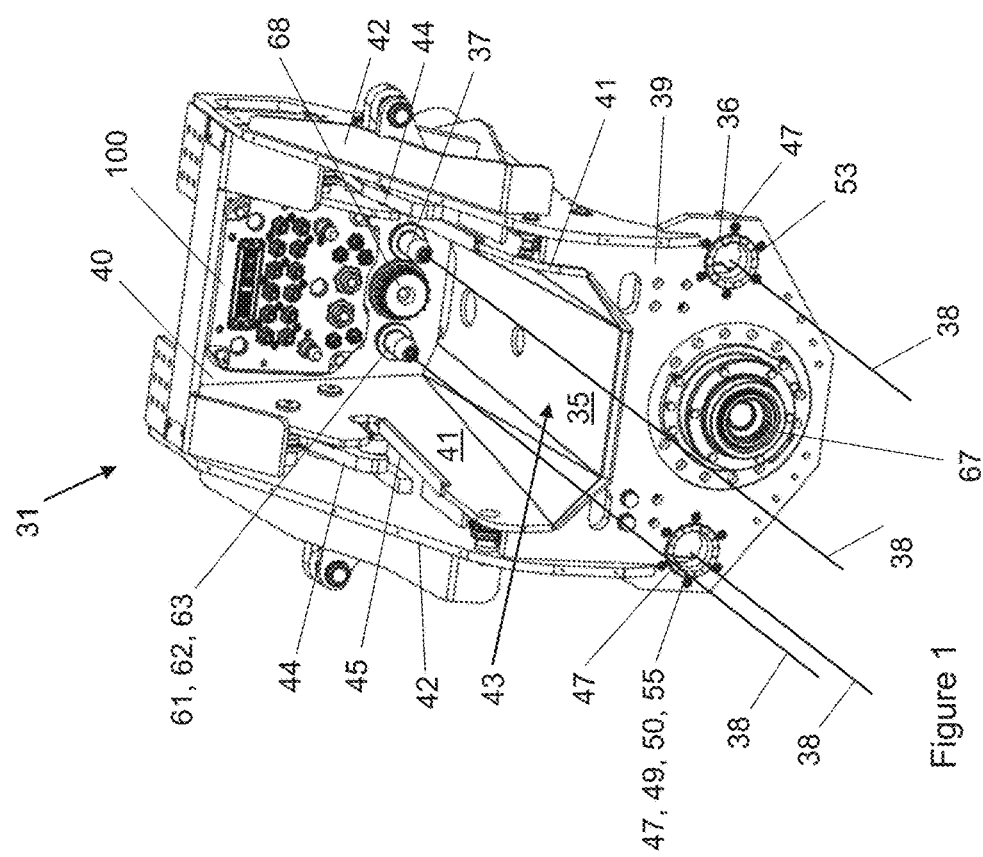
FIG. 1: a perspective illustration of a docking receptacle according to the disclosure.
Figure 4:
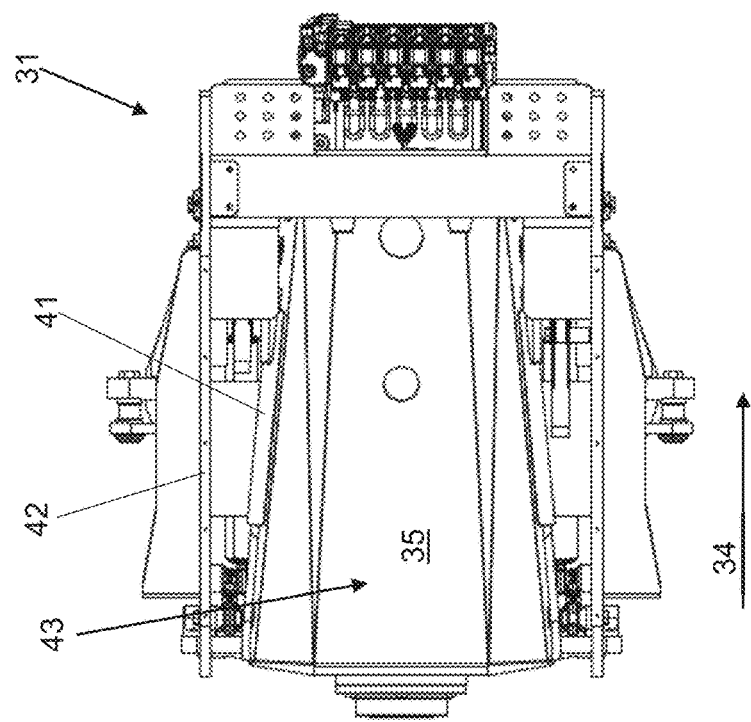
FIG. 4: a top plan view of the docking receptacle according to the disclosure.
Figure 3:
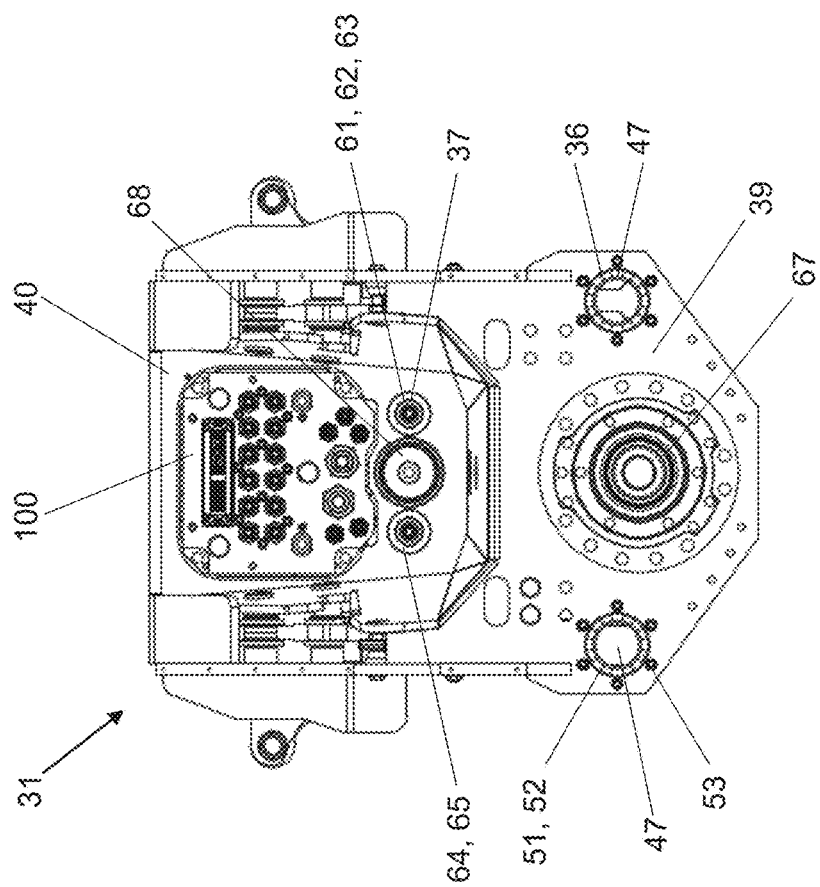
FIG. 3: a front plan view of the docking receptacle according to the disclosure.
Figure 6:
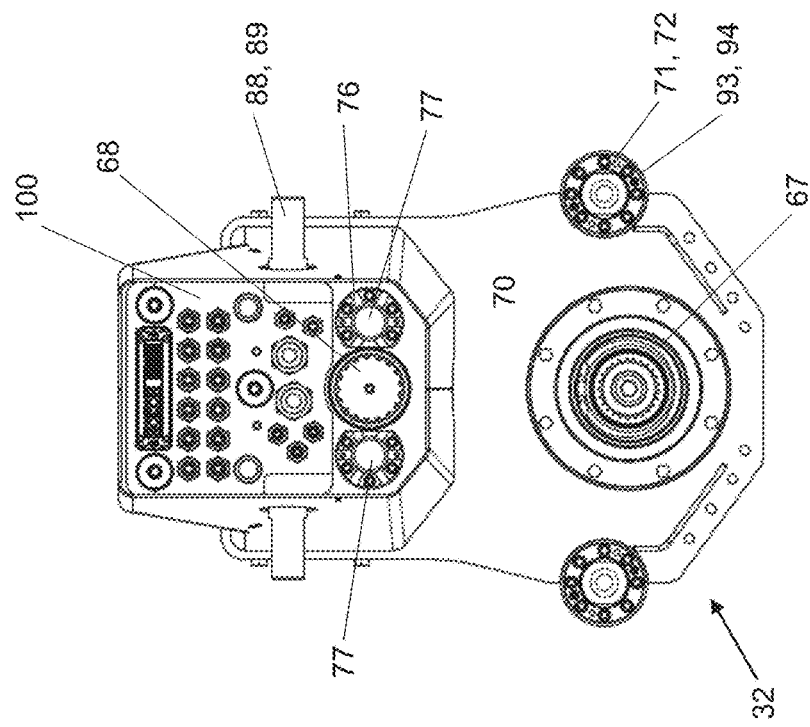
FIG. 6: a front plan view of the docking insert according to the disclosure.
Figure 5:
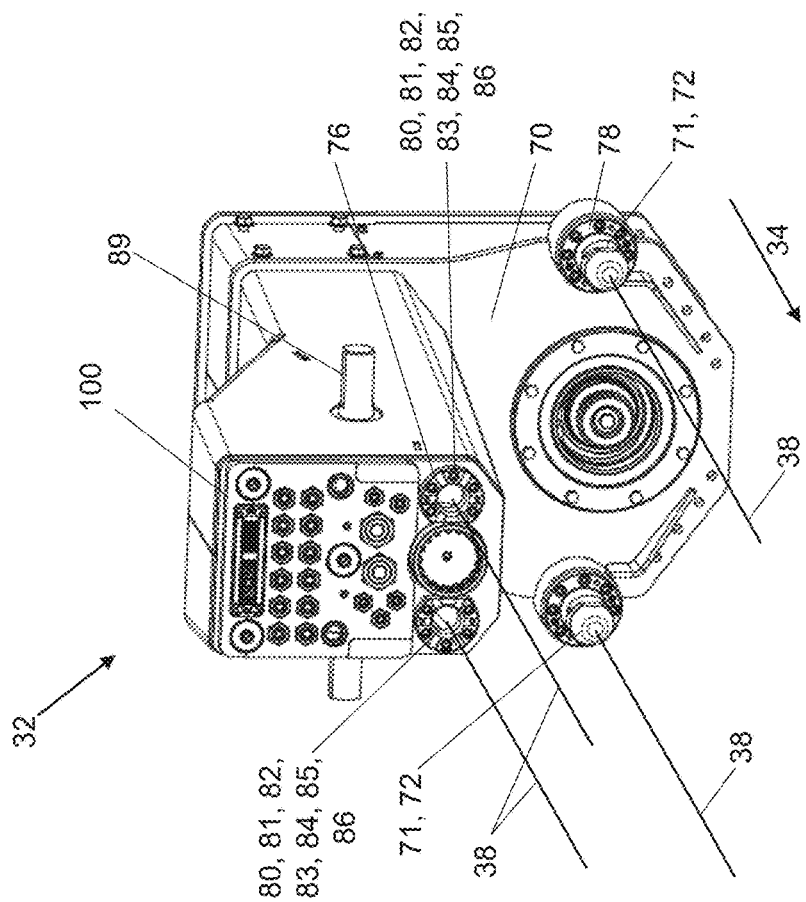
FIG. 5: a perspective illustration of a docking insert according to the disclosure.
Figure 8:
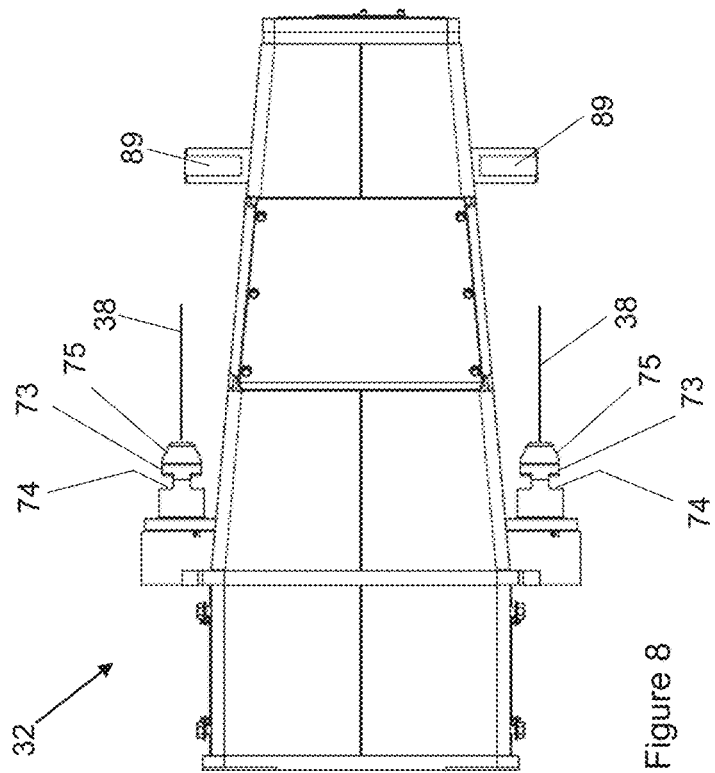
FIG. 8: a top view of the docking insert.
Figure 7:
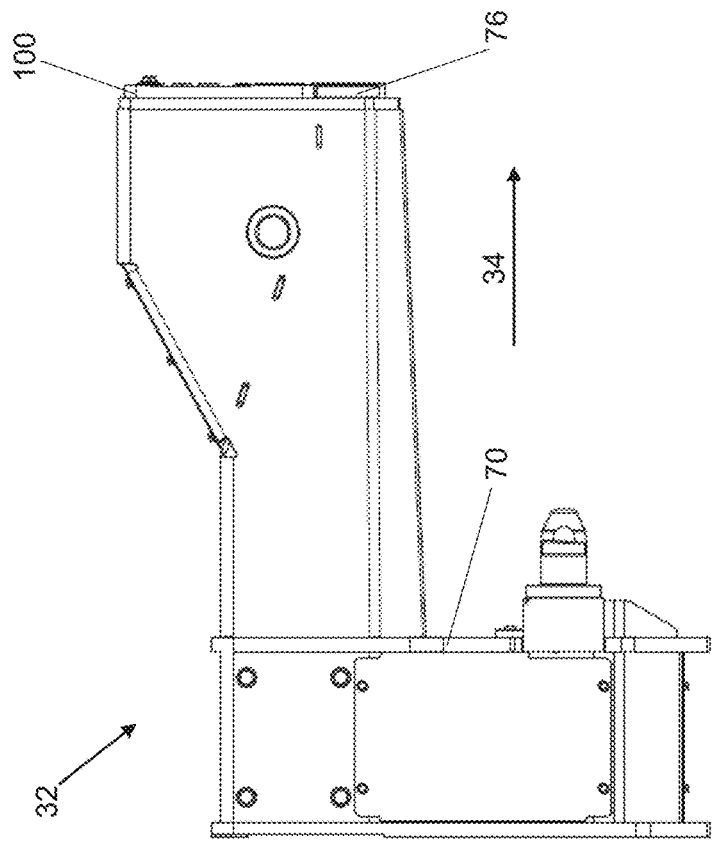
FIG. 7: a side plan view of the docking insert.
Figure 10:
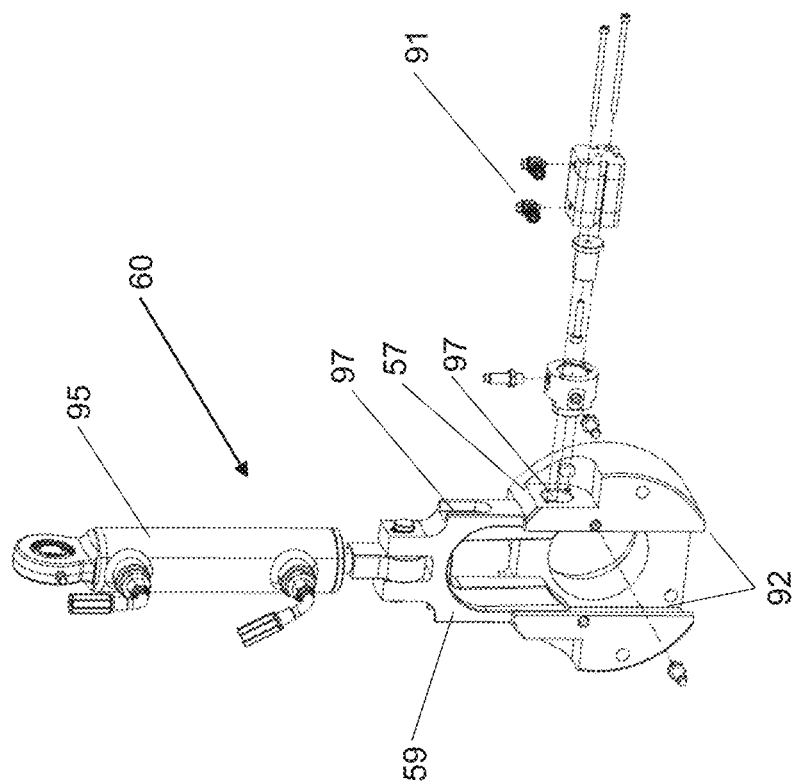
FIG. 10: a further perspective partial exploded drawing of the wedge fork with hydraulic cylinder and the locking device.
Figure 9:
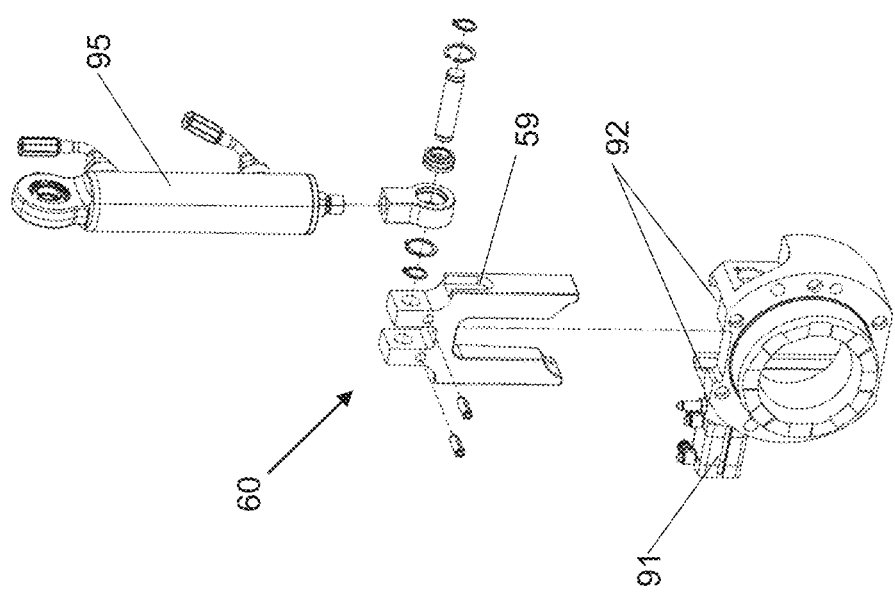
FIG. 9: a perspective partial exploded drawing of a wedge fork with hydraulic cylinder and a locking device.

A docking receptacle 31 (first coupling device) of a docking assembly 30 (coupling assembly) for receiving a docking insert 32 (second coupling device) according to the disclosure will be described by way of example on the basis of an exemplary embodiment (FIGS. 1 to 3 and 9 to 11). The docking receptacle 31 comprises an approximately U-shaped pilot centring device 33 with an insertion trough 35 tapering approximately conically in an insertion direction 34 for pre-centring a docking insert 32 designed to mate the docking receptacle. In addition, at least one first and one second centring device 36, 37 are provided on the docking receptacle 31, with the first and the second centring devices 36, 37 each comprising two coupling elements and/or coupling counter-elements for connecting to corresponding coupling elements and/or coupling counter-elements of a docking insert 32.

Furthermore, the first and the second centring device 36, 37 are designed for centring the docking insert 32 with respect to the docking receptacle 31 along four centring axes 38 corresponding to the four coupling elements or coupling counter-elements in the insertion direction 34. In addition, the docking receptacle 31 comprises a drawing-in device with two hydraulically actuated capture hooks 44 for drawing the docking insert 32 into the docking receptacle 31 in the insertion direction 34. The docking receptacle 31 comprises two docking walls 39, 40 extending vertically and arranged offset from one another in the horizontal direction. These two docking walls 39, 40 are connected to one another by an insertion trough 35 extending in an approximately horizontal direction. Accordingly, a first docking wall 39 is arranged vertically in the region beneath the insertion trough 35 and a second docking wall is arranged as a limit to the insertion trough 35 in the horizontal direction above the insertion trough 35.

The insertion trough has the task of pre-centring on introduction of a docking insert into the docking receptacle by receiving a body of the docking insert 32 designed to mate with the insertion trough 35. In order to pre-centre the docking insert 32 on introduction into the docking receptacle 31, the geometry of the insertion trough 35 tapers in the insertion direction 34 to permit pre-centring of the docking insert. Inner and outer side walls 41, 42 extending vertically are provided on either side of the insertion trough 35 approximately transverse to the insertion direction 34. These inner and outer side walls 41, 42 are arranged at a predetermined angle in the insertion direction 34 in such a manner that a receiving space 43, delimited by the inner side walls 41 and the insertion trough 35 tapers in the insertion direction.

Capture pin guides 45, which are provided to guide and receive corresponding capture pins formed on a docking insert 32, are formed in the inner side walls 41. Shafts, on which the capture hooks 44 are mounted for rotation, are arranged in corresponding bores in the inner and outer side walls 41, 42. The capture hooks are thus arranged in a capture hook space delimited by the inner and outer side walls. The capture hook can be actuated by corresponding capture hook cylinders 46. Socket-style centring pin receptacles 47 (coupling counter-elements) are provided in the region of the first docking wall 39 and form the first centring device 36 of the docking receptacle 31. The first docking wall 39 is provided first in the insertion direction 34 and has two bores 48 for receiving the socket-style centring pin receptacles 47. The socket-style centring pin receptacles 47 are arranged in the bores 48. The socket-style centring pin receptacles 47 are hence arranged behind the first docking wall 39 in insertion direction 34. The socket-style centring pin receptacles 47 comprise a tubular insertion/centring portion 49 and a securing portion 54 in insertion direction 34.

The tubular insertion/centring portion 49 has a conically tapering insertion recess 50, with a vertical end face arranged against the insertion direction 34 projecting from the first docking wall 39 and forming a first axial stop face 51 of a first stop device 52. Dirt discharge grooves 53 which run radially circumferentially and are spaced evenly apart from one another for receiving and discharging dirt are formed in this circular first stop face 51. Soiling of this kind would modify the position of the stop. This is disadvantageous because precise coupling between docking receptacle and docking device is not possible. The tubular insertion/centring portion 49 has a cylindrical centring recess 55 connecting to the insertion recess in insertion direction 34. The tubular securing portion 57 has, on a circular end face lying contrary to the insertion direction 34, bores 56 for connecting to the first docking wall 39, using mating threaded fasteners, for instance. This end face has a greater diameter than the tubular insertion/centring portion 49 and in this way forms a radially circumferential stop shoulder which prevents the socket-style centring receptacle moving contrary to the insertion direction 34.

This design has the advantage that the longitudinal forces which are introduced by implements on the one hand and, on the other hand, are overlaid by the wedge forces from the wedge forks, do not need to be introduced into the docking receptacle through a bolted joint. In addition, vertically extending grooves 58 are found in the tubular securing portion 57 for receiving hydraulically actuated wedge forks 59. The wedge forks 59 are provided to fix a corresponding centring pin of a docking insert 32 and can be moved vertically from a release setting into a fixing setting. The wedge forks 59 thus form an axial securing device 60.

A drive shaft connecting device is provided approximately centrally in the first docking wall 39 in the area between the two socket-style centring pin receptacles 47. A drive shaft connecting device 67 is part of a drive shaft connecting assembly for connecting an end of a drive shaft on the vehicle to an end of a drive shaft on the implement. A recess 66 is formed in the second docking wall 40 to receive a coupling plate for providing electrical, electronic, hydraulic and/or pneumatic connections between a vehicle and an implement. The coupling plate with flange-mounted valve block can be removed very easily and quickly against the insertion direction 34 for repair purposes by removing just four bolts. Additionally, two centring pins 61 (coupling elements) extending against to the insertion direction 34 are provided in the region of the second docking wall 40 forming the second centring device 37 in the docking receptacle 31. The centring pins 61 have an insertion portion 62 tapering in the insertion direction 34 and a cylindrical centring portion 63 connected to this.

A circular vertical end face located at the front in insertion direction 34 and connecting to the centring portion 63 forms a second stop face 64 of a second stop device 65. The coupling elements and/or the coupling counter-elements of the first and the second centring devices thus form at least two axial stop devices which limit any relative movement between the docking receptacle and a docking insert in the insertion direction. The stops are preferably formed on the first and/or second centring pins and/or on the first and/or second centring recesses as annular stop faces extending in a plane normal to the insertion direction. A PTO (power take off) shaft connecting device 68 is provided approximately centrally in the second docking wall 40 in the area between the two centring pins 66. A PTO shaft connecting device 68 is part of a PTO shaft connecting assembly for connecting an end of a PTO shaft on the vehicle to an end of a PTO shaft on the implement.

The docking receptacle is positioned on a centring shoulder on a central pipe flange of an axle centre assembly by means of a large (diameter approximately 258 mm) machined bore in the first plate. This precision makes it possible for a connecting shaft with toothed sleeves to be used for connecting the PTO from the transmission and the PTO shaft connecting device. This means that an expensive, and moreover not maintenance-free, joint using a cardan shaft is not necessary. The docking insert 32 according to the disclosure is described below by way of example. The docking insert 32 is designed to mate with the docking receptacle 31. The docking insert 32 comprises in insertion direction 34 first a first docking wall 70. The first docking wall 70 extends substantially vertically and has on the underside an underwall 89 designed to mate with the insertion trough 35 of the docking receptacle 31. Furthermore, a drive shaft connecting device is provided approximately centrally on the first docking wall 70.

First centring pins 71 extending in insertion direction 34 of a first centring device 72 of the docking insert 32 are formed on the first docking wall 70 of the docking insert 31 to match the centring pin receptacles 47 of the first centring device 36 of the docking receptacle 31. The first centring pins 71 have, in insertion direction 34, a cylindrical centring portion 73 and a tapering insertion portion 74 connecting to this. Additionally, the first centring pins 71 have, against the insertion direction, circular first stop faces 93 which form a first stop device 94 of the first centring device 72. Wedge fork receiving grooves 74 extending vertically and designed to be convex and to match the wedge forks 59 are provided in the cylindrical centring portion 73. An insertion body 75 extending in the insertion direction for arranging in the receiving space 43 of the docking receptacle 31 is provided on the first docking wall. Forwards in the insertion direction, the insertion body 75 has a second docking wall 76 extending in an approximately vertical direction. Centring pin receptacles 77 of a second centring device 78 of the docking insert 32 are formed to match the second centring pins 61 of the second centring device 37 of the docking receptacle 31 are formed in the second docking wall. The second docking wall 76 has two bores 80 for receiving the socket-style centring pin receptacles 77. The socket-style centring pin receptacles 77 are arranged in the bores 80. The socket-style centring pin receptacles 77 comprise a centring portion 82 and an insertion portion 81 in insertion direction 34.

The tubular insertion portion 81 has a conically tapering insertion recess 83, with a vertical end face arranged against the insertion direction 34 projecting from the second docking wall 76 and forming a second axial stop face 84 of a second stop device 85. Dirt discharge grooves 86 which run radially circumferentially and are spaced evenly apart from one another for receiving and discharging dirt are formed in this circular second stop face 85. The tubular centring portion 82 has a cylindrical centring recess 87 connecting to the insertion recess 83 in insertion direction 34. A PTO shaft connecting device is arranged in the area between these centring pin recesses 77. A coupling plate receptacle is formed in the area vertically above the second centring device 78.

In addition, a capture pin shaft 88 extending transversely to the insertion direction 34 is arranged on the insertion body 75. The ends of the shaft form capture pins 89. These capture pins 89 are captured by the capture hooks 44 of the docking receptacle 31 on insertion of the docking insert 32 into the docking receptacle 31 and then the docking insert 32 is drawn into the docking receptacle 32 by means of the hydraulically actuated capture hooks 44, with an underwall 90 of the insertion body 75 of the docking insert 32 sliding correspondingly in the insertion trough 35 of the docking receptacle 31. In addition to an axial locking as a securing device 60, the hydraulic wedge forks also have a second locking device extending transversely to the insertion direction. The second locking device comprises a pneumatically actuated securing body which fixes the wedge forks in the centring pin bushes. This second lock can only be secured if the hydraulic wedge fork is correctly positioned. Accordingly, a sensor is provided to monitor the position of the hydraulic wedge fork. Wedge forks have the advantage that they are simple to automate. The wedge forks are guided in the wedge fork grooves at all times.

In accordance with an alternative embodiment, the disclosure can also provide that the centring devices or the centring elements thereof (pins, bushes) are swapped over. The only matter of critical importance here is that both the two centring pins or centring recesses of the first and the second centring devices are designed in such a manner that all four components permit simultaneous centring, as an implement mounted on the docking insert often weighs a good deal and precise centring in the axial insertion direction is accordingly necessary. A coupling plate 100 is described below.

A coupling plate 100 is provided for making electrical, electronic, hydraulic and/or pneumatic connections. This coupling plate 100 comprises an approximately flat base plate 101. This base plate 101 can be provided with a plurality of electrical, electronic, hydraulic and/or pneumatic or even mechanical connectors. At least two hydraulic ports 113 are formed on the base plate 101. These hydraulic ports 113 are provided for operating the support foot cylinders present on practically all connectable modules. In addition, at least one electronic connector 102 is provided on the base plate 101 for making an electronic connection between a control device of a vehicle and a control device of a vehicle. This electronic connection is used to identify the nature of the module or the trailer or implement.

Furthermore, at least one electrical connector 103 is mounted on the base plate 101. This electrical connector is provided for operating a light (e.g. brake light, headlight, rear light, position or warning light) on the attached module. Additionally, two electrical monitoring contacts 104, which are electrically connected to one another by coupling the docking insert 32 to the docking receptacle 31, are provided to detect whether the docking insert 32 is fully drawn into the docking receptacle 31 and a securing and/or locking device can be activated.

The coupling plate has a centring device 105 in addition to the minimum connection equipment listed above. This centring device 105 comprises, when the coupling plate 100 is provided for the docking receptacle 31, at least two centring pins 106, with the mating centring recesses 107 being formed correspondingly on a coupling plate of the docking insert 32. The centring device comprises at least two coupling (centring pins 106) and/or coupling counter-elements (centring recess 107). Additionally, a coupling plate 100 includes three connecting bores 108 for connecting the coupling plate 100 to a docking insert 32 or a docking receptacle 31.

Tubular plastic bushes 109 or rubber mounts made from a resilient material can be arranged in these connecting bores 108, preferably on the docking insert 32, to permit a small amount of play and hence to increase precision in connecting two coupling plates. Fasteners 111, such as bolts, can be arranged in corresponding recesses 110 in the plastic bushes 109 to connect the coupling plate 100 to a coupling device, such as a docking insert 32 or a docking receptacle. The plastic bushes 109 together with the fasteners 111 form a mount 112. Pneumatic ports 114 are also provided in the base plate 101. Features of the coupling plate are described in greater detail below.

A coupling plate 100 mounted on the vehicle comprises the approximately flat base plate 101, on which the implement-mounted electrical connector 103 and/or electronic connector 102, such as plugs 102, hydraulic ports 113, such as hydraulic couplings 113, and pneumatic ports 114, such as compressed air couplings and centring pins 106 for precision centring of the implement-mounted coupling plate, are integrated. A valve block 115 with up to six double-acting hydraulic control units (not illustrated) is flange-mounted.

The coupling plate 100 is designed in respect of its hydraulics such that only the pressure, reservoir and load signalling lines are connected for working hydraulics. The line between these main ports and the couplings of a Power Beyond system and the supply to the valve block 115 is built into the base plate 101. The base plate 101 is securely bolted to a docking receptacle 31 on the vehicle using fasteners 111. The implement-mounted coupling plate 100 on the docking insert holds the corresponding mating connectors and couplings and is securely fastened to a docking insert 32 via the mount 112 or the plastic bushes 109 and the fasteners 111.

The mount 112 is thus designed to provide a slight play in the coupling plate in a vertical and a horizontal plane in relation to a coupling device. This makes it possible for the coupling plate 100 to be centred precisely via the plastic bushes 109 or rubber bushes and the bores provided therein in respect of the centring pins 106 on the vehicle to achieve the precise alignment in the range of 0.05 mm required for the hydraulic coupling.

The following connections are established simultaneously during coupling when connecting two coupling plates according to the disclosure designed for connecting a vehicle to an implement:
- electrical connections (lighting, electrical power supply)
- electronic connections (CAN bus, ISO bus, Ethernet, as necessary)
- hydraulic ports for vehicle hydraulics and working hydraulics
- up to six double action hydraulic control units with a maximum flow of 100 litres per minute each
- Power Beyond port with a maximum flow of 180 litres per minute
- hydraulic ports for support feet on the implement
- compressed-air supply
- compressed air brake for couplable auxiliary axle modules and/or trailers or implements.

Two coupling plates 100 according to the disclosure are connected by connecting a docking insert 32 to a docking receptacle 31. Accordingly it is provided that, on connection of two coupling plates 100 according to the disclosure, the centring pins 106 of a coupling plate 100 connected to a docking receptacle 31 penetrate the corresponding centring recesses 105 on a coupling plate according to the disclosure connected to a docking insert 32 and this causes the two coupling plates 100 to align precisely with one another, particularly in a vertical connecting plane. This causes all the electrical, electronic, hydraulic and/or pneumatic connections provided on docking insert 32 and docking receptacle 31 to be connected to one another.

A method for docking or inserting the docking insert into the docking receptacle or a method according to the disclosure for connecting a docking insert to a docking receptacle is described below. First the insertion body 75 of the docking insert is arranged in the area of the receiving space 43 in the docking receptacle 31, preferably by moving the vehicle and thus the docking receptacle 31 arranged thereon. This gives rise to pre-centring of the docking insert in the docking receptacle as the underwall or insertion wall 90 of the docking insert 32 slides in the insertion trough 35 of the docking receptacle 31.

Once a relative movement in the insertion direction has completed a predefined distance, the capture hooks 44 in the docking receptacle are actuated using the capture hook cylinders 46 and first lowered vertically downwards, so that the capture recesses 69 on the capture hooks 44 engage the capture pins 89 on the docking insert. The docking insert thus initially moves into the docking receptacle as a result of the movement of the vehicle. Pre-centring results. The capture hooks then engage and draw the docking insert in the insertion direction into the docking receptacle. Two rollers, mounted for rotation in the docking receptacle, form a sliding guide together with a slot in the capture hook and a track on the upper side of the capture hook. This sliding guide has the result that the capture hooks first move in the vehicle longitudinal direction and then upwards as they are extended. As a result there is an opening into which the capture pins are introduced as they extend into the docking insert. The capture hooks first move downwards and hook onto the capture pins to draw the capture hooks in. The docking insert is then drawn in.

The capture pins then slide along a capture pin guide 45 in the inner side walls 41 of the docking receptacle 31, with the capture pins 89 being located in the capture pin guide 45 with merely a minor amount of play. Then, by a further movement of the docking insert 31 in the insertion direction 34, the docking insert 32 is further centred in the docking receptacle 31 along the four centring axes 38 by the first and second centring devices 36, 37, 72, 78 of the docking receptacle 31 and of the docking insert 32. The two centring pins 71 of the first centring device 72 of the docking insert 32 here slide with their tapering insertion portions 74 into the conical insertion openings 50 of the two centring pin receptacles 47 of the first centring device 36 of the docking receptacle 31.

At the same time the conical surfaces of the insertion portions 62 of the centring pins 61 of the second centring device 37 on the docking receptacle 31 slide into the insertion recesses 83 of the centring pin receptacles 77 of the second centring device 78 on the docking insert. Then, by a further movement of the docking insert 31 in the insertion direction 34, the docking insert 32 is further precisely centred in the docking receptacle 31. The two centring pins 71 of the first centring device 72 of the docking insert 32 here slide with their cylindrical centring portions 73 into the cylindrical centring recesses 55 of the two centring pin receptacles 47 of the first centring device 36 of the docking receptacle 31.

At the same time the cylindrical centring portions 63 of the centring pins 61 of the second centring device 37 on the docking receptacle 31 slide into the centring recesses 87 of the centring pin receptacles 77 of the second centring device 78 on the docking insert. The movement of the docking insert 32 in the insertion direction 34 towards the docking receptacle 31 is restricted by the first stop faces 51, 93 of the first stop devices 52, 94 of the first centring device 36, 72. In addition, the movement of the docking insert 32 in the insertion direction 34 towards the docking receptacle 31 is restricted by the second stop faces 64, 84 of the second stop devices 65, 85 of the first centring device 36, 72.

As soon as the stop faces 51, 93 of the first stop devices 52, 94 and the stop faces 64, 84 of the second stop device 65, 85 are in contact with one another, the insertion of the docking insert 32 into the docking receptacle 31 in the axial direction is limited. The docking insert 32 is now fully inserted into the docking receptacle 31.

Electrical contacts (not illustrated), which make contact with one another as soon as the docking process is completed, are preferably provided both on the docking insert 32 and on the docking receptacle 31. A signal generated in this way is used to move the actuating cylinders 95 of the hydraulically actuated wedge forks 59 vertically downwards in such a manner that the forces of the wedge forks 59 engage in the grooves 58 of the securing portion 57 of the first centring pin 71 of the first centring device 72 on the docking insert and, in addition to the capture hooks 44, prevent uncoupling of the docking insert 32 from the docking receptacle 31.

A pneumatically actuated locking device 91 is proved to secure the wedge forks; this locking device applies corresponding locking lugs 96 through locking holes 97 formed in the securing portion 57 and in the forks of the wedge fork 59 and in this way fix and secure the position of the wedge forks 59. At the same time, PTO shaft connecting devices and/or drive shaft connecting devices on the docking receptacle 31 and the docking insert 32 are connected to one another, as appropriate, in this end position.

LIST OF REFERENCE NUMBERS

30 Docking assembly
31 Docking receptacle
32 Docking insert
33 Pilot centring device 34 Insertion direction
35 Insertion trough
36 First centring device
37 Second centring device
38 Centring axes
39 First docking wall
40 Second docking wall
41 Inner side wall
42 External side wall
43 Receiving space
44 Capture hook
45 Capture pin guide
46 Capture hook cylinder
47 Centring pin receptacle
48 Bore
49 Insertion/centring portion
50 Conical insertion opening
51 First axial stop face
52 First stop device
53 Dirt discharge grooves
54 Tubular centring portion
55 Cylindrical centring recess
56 Bore
57 Securing portion
58 Grooves
59 Wedge fork
60 Axial securing device
61 Centring pin
62 Insertion portion
63 Centring portion
64 Second stop face
65 Second stop device
66 Recess
67 Drive shaft connecting device
68 PTO shaft connecting device
69 Capture recesses
70 First docking wall
71 First centring pin
72 First centring device
73 Cylindrical centring portion
74 Wedge fork receiving groove
75 Insertion body
76 Second docking wall
77 Centring pin receptacle
78 Second centring device
79 Coupling plate receptacle
80 Bore
81 Securing portion
82 Centring portion
83 Insertion recess
84 Second stop face
85 Second stop device
86 Dirt discharge groove
87 Centring recess
88 Capture pin shaft
89 Capture pin
90 Underwall
91 Locking device
92 Wedge fork receiving groove
93 First stop face
94 First stop device
95 Wedge fork actuating cylinder
96 Locking lug
97 Locking hole
100 Coupling plate
101 Base plate
102 Electronic connector
103 Electrical connector
104 Electrical monitoring contact
105 Centring device
106 Centring pin
107 Centring recess
108 Connecting bore
109 Plastic bush
110 Recess
111 Fastener
112 Mount
113 Hydraulic port
114 Pneumatic port
115 Valve block

The invention claimed is:

1. A docking assembly with a first docking device and a second docking device, wherein the first docking device has an approximately U-shaped pilot centring device with a conically tapering insertion trough or at least one first and one second centring device, wherein the first and the second centring device each comprise coupling elements or coupling counter-elements, and having a second docking device with a pilot centring body having an insertion tray extending in the horizontal direction and tapering approximately conically in an insertion direction having at least one first and one second centring device, wherein the first and the second centring devices each comprise two coupling elements and/or coupling counter-elements for centring the second docking device in the first docking device,
wherein a fixing device is provided in a fixing region of the first centring recesses, wherein the fixing device is designed for axially fixing first centring pins of a docking insert in the correspondingly designed first centring recesses of the docking receptacle and wherein the fixing device has, for the purposes of fixing, hydraulically actuated wedge forks which can be displaced vertically in such a manner that fixing faces of the wedge forks engage in corresponding fixing grooves in the centring pins.

2. The docking assembly of claim 1, wherein a first docking wall is formed in an insertion direction at the rear on the insertion trough in a plane extending transverse to the insertion direction on the first docking device, in which wall a docking recess is formed for receiving a coupling plate fixed in the insertion direction and a second docking wall extending in a plane transverse to the insertion direction is formed on the second docking device on the front of the insertion body in the insertion direction, wherein a docking recess is formed in the second docking wall for receiving an axial securely fixed coupling plate.

3. The docking assembly of claim 2, wherein a drive shaft coupling device is provided in the first docking wall of the first docking device and the second docking wall of the second docking device for connecting a drive shaft on the implement to a drive shaft on the vehicle, wherein the drive shaft coupling devices are designed to be aligned axially in the retracted state and the locked state of the docking devices to establish a forced connection and are each secured axially so that a forced connection is established on mechanical coupling of the coupling devices.

4. The docking assembly of claim 2, wherein PTO shaft coupling devices are arranged in each of the first and second docking walls for connecting a PTO shaft on the implement to a PTO shaft on the vehicle, wherein the PTO shaft coupling devices in the coupled state are aligned with one another and are axially secured on the second docking wall in such a manner that a forced connection is established on connection of the docking devices to one another.

5. The docking assembly of claim 2, wherein the first docking device is designed as a docking receptacle comprising an approximately U-shaped pilot centring device with an insertion trough tapering approximately conically in an insertion direction for pre-centring a docking insert designed to mate with the docking receptacle,
- at least one first and one second centring device, with the first and the second centring devices each comprising two coupling elements or coupling counter-elements which are designed for centring a docking insert with respect to the docking receptacle along four centring axes in an insertion direction, and
- a drawing-in device with two hydraulically actuated capture hooks.

6. The docking assembly of claim 5, wherein the first centring device has two coupling counter-elements which are designed as socket-style first centring recesses.

7. The docking assembly of claim 5, wherein the second centring device has coupling elements which are designed as centring pins, wherein the centring pins preferably have a conical centring portion and a cylindrical centring portion in the insertion direction.

8. The docking assembly of claim 5, wherein the coupling elements and/or the coupling counter-elements of the first and the second centring devices comprise at least two axial stop devices, which limit a relative movement between docking receptacle and docking insert, with the stops preferably being formed on the first and/or second centring pin and/or on the first and/or second centring recesses as circular stop faces and extending in a plane perpendicular to the insertion direction, and wherein the axial stop faces have recesses arranged radially circumferentially and spaced equally apart from one another.

9. The docking assembly of claim 5, wherein a second docking wall extending in a plane transverse to the insertion direction is formed on the insertion trough at the front in the insertion direction.

10. The docking assembly of claim 5, wherein a first docking wall extending in a plane transverse to the insertion direction is formed on the insertion trough at the rear in the insertion direction, which wall is arranged vertically beneath the insertion trough.

11. The docking assembly of claim 5, wherein a docking recess for receiving a coupling plate which can be fixed in position is formed in the second docking wall.

12. The docking assembly of claim 5, wherein the insertion trough comprises two inner side walls extending vertically and joined to the insertion trough and the second docking wall, with capture hooks being mounted for rotation between the side walls.

13. The docking assembly of claim 5, wherein a drive shaft coupling device for connecting a drive shaft on the vehicle to a drive shaft on the implement is provided in the first docking wall.

14. The docking assembly of claim 5, wherein a PTO shaft coupling device for connecting a PTO shaft on the vehicle to a PTO shaft on the implement is provided in the second docking wall.

15. The docking assembly of claim 2, wherein the second docking device is designed as a docking insert comprising
- a pilot centring body having an insertion surface tapering approximately conically in an insertion direction and extending in the horizontal direction,
- at least one first and one second centring device, with the first and the second centring devices each comprising two coupling elements and/or coupling counter-elements which are designed for centring the docking insert with respect to a docking receptacle along four centring axes extending in an insertion direction, and
- two capture pins extending transversely to the insertion direction in the horizontal.

16. The docking assembly of claim 15, wherein the first centring device has two coupling elements which are designed as first centring pins, wherein the centring pins preferably have a cylindrical centring portion and a tapering centring portion in the insertion direction.

17. The docking assembly of claim 15, wherein the second centring device has two coupling counter-elements which are designed as socket-style second centring receptacles.

18. The docking assembly of claim 15, wherein the coupling elements and/or the coupling counter-elements of the first and the second centring devices have at least two axial stop devices which limit any relative movement between the docking insert and docking receptacle in the axial direction or in the insertion direction.

19. The docking assembly of claim 15, wherein a second docking wall extending in a plane transverse to the insertion direction is formed on the insertion body at the front in the insertion direction.

20. The docking assembly of claim 15, wherein a first docking wall extending in a plane transverse to the insertion direction is formed on the insertion body at the rear in an insertion direction, which wall is arranged vertically beneath the insertion body.

21. The docking assembly of claim 15, wherein a docking recess for receiving a coupling plate which can be fixed in position is formed in the second docking wall.

22. The docking assembly of claim 15, wherein the insertion body comprises two side walls extending vertically and joined to the second docking wall and the first docking wall, with capture pins extending transversely to the insertion direction being arranged on the side walls.

23. A vehicle with a first docking device according to claim 1 or a second docking device according to claim 1.

24. An implement, trailer or auxiliary axle with a second docking assembly in accordance with claim 1 or a first docking device in accordance with claim 1.

25. A method for coupling a vehicle comprising a first or second docking device to an auxiliary axle, a trailer or an implement comprising a second or first mating docking device comprising the following steps
- arranging the insertion body of the docking insert in the area of the receiving space in the docking receptacle so that the docking insert is pre-centred with respect to the docking receptacle,
- actuating the capture hooks by means of the capture hook cylinders,
- lowering the capture hooks vertically downwards,
- drawing the docking insert into the docking receptacle by means of the capture hooks,
- centring the docking insert with respect to the docking receptacle along four centring axes by means of the first and second centring devices of the docking insert and of the docking receptacle,
- providing a fixing device in a fixing region of the first centring recesses, the fixing device designed for axially fixing the first centring pins of the docking insert in the correspondingly designed first centring recesses of the docking receptacle, wherein the fixing device has, for the purposes of fixing, hydraulically actuated wedge forks which can be displaced vertically in such a manner that fixing faces of the wedge forks engage in corresponding fixing grooves in the centring pins, coupling at least one of the first and second centring devices of the docking insert with at least one of the first and second centring devices of the docking receptacle, and reaching an end position.

26. The method of claim 25, wherein the movement of the docking insert into the docking receptacle in the insertion direction is limited by at least one axial stop device.

27. The method of claim 25, wherein the end position of the docking insert in the docking receptacle is fixed by means of an axial securing device.

28. The method of claim 27, wherein the position of the securing device is locked by means of a locking device.

* * * * *